Figure 1:
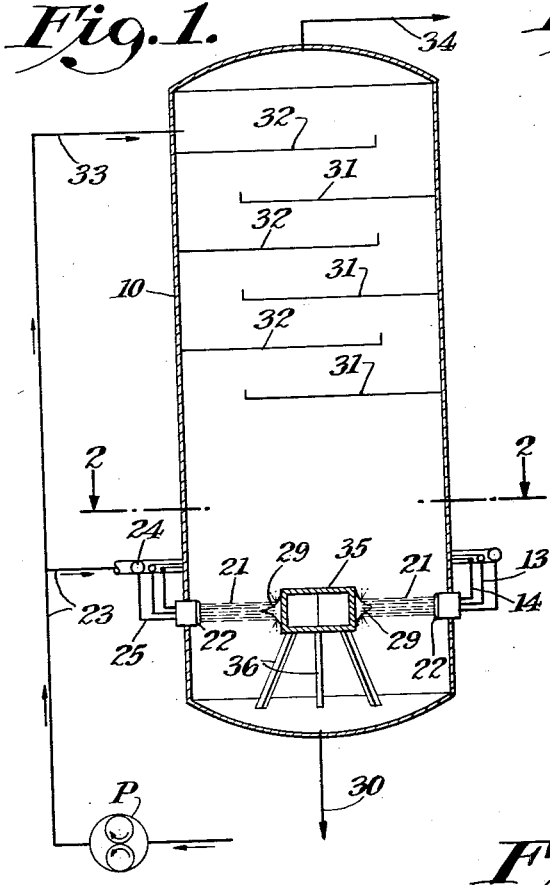

April 16, 1957 — A. H. SCHUTTE — 2,789,148
CONVERSION OF HYDROCARBONS
Filed Oct. 25, 1955

INVENTOR
August Henry Schutte
BY
AGENT

United States Patent Office 2,789,148
Patented Apr. 16, 1957

2,789,148

CONVERSION OF HYDROCARBONS

August H. Schutte, Hastings on Hudson, N. Y., assignor to The Lummus Company, New York, N. Y., a corporation of Delaware Application October 25, 1955, Serial No. 542,539

6 Claims. (Cl. 260—679)

The present invention relates to the conversion of hydrocarbons, and in particular concerns an improved method and apparatus for converting hydrocarbons by partial oxidation thereof to other carbon and hydrogen-containing gases.

The preferred technique in producing light hydrocarbon fractions including acetylene by incomplete combustion of hydrocarbons, such as methane, ethane, natural gas, vaporized light distillates, etc., with oxygen or an oxygen-containing gas such as air, is to preheat the hydrocarbons and oxygen separately and to subject them, after mixing, to reaction with the formation of a flame. Such oxidation, however, does not occur to any significant extent except at elevated temperatures which favor a variety of side reactions. Further, the very hot flame provides high heat radiation back to the mixing device and to the combustion chamber walls and without proper reactor design and operation, the apparatus may be injured or destroyed. Also since the gases, by reason of preheating, are in a highly reactive condition, it is necessary to effect the intimate mixing of the gases in the shortest possible time so that a controllable reaction in the combustion zone is obtained. Whereas a number of techniques are known to satisfy these demands in small-scale operations, substantial difficulties are encountered when operating in larger scales.

It is accordingly an object of the present invention to provide an improved reactor for the production of light hydrocarbons including acetylene by the partial oxidation of hydrocarbons.

Another object is to provide a high capacity reactor in which light hydrocarbons including acetylene may be produced from gaseous or vaporized hydrocarbons in higher yields than attained heretofore.

A further object is to provide a reactor or combustion chamber wherein hydrocarbons are caused to react with oxygen to form lighter fractions such as acetylene and wherein the high temperature heat radiated from the reacting gas mixture will not damage or destroy apparatus in the mixing zone.

Further objects and advantages of the invention will appear from the following description taken in connection with the accompanying drawing.

To illustrate the invention I have hereinafter described my process with regard to the partial oxidation of a hydrocarbon to produce acetylene.

In accordance with my invention, acetylene is produced by the partial oxidation of a hydrocarbon, with oxygen or an oxygen-containing gas in a reaction zone or combustion chamber which is formed by an annular wall or curtain of liquid which moves at high velocity toward a quenching target wall. The reaction of gases within the liquid walled reaction zone is carried out at an acetylene producing temperature, e. g., between about 1100° and 1500° C. and at such a rate that the time of passage through the reaction zone to an initial quench is between about 0.0005 and about 0.005 second. By limiting the period of time over which the gas mixture is permitted to remain at temperatures within such range and thereafter immediately cooling the gas mixture to a temperature at which substantially no further reaction takes place, e. g., about 650° C. or lower, acetylene may be obtained in maximum yields. The time of reaction which may preferably be approximately 0.001 second, is accurately controlled by varying the length of the reaction zone through a position adjustment of the target wall. Reacting gases within the reaction zone are deflected by the target wall after the appropriate reaction time interval and are radially directed through the liquid wall whereupon they are quenched to a temperature below the reaction temperature. By utilizing a liquid as the reaction confining means for the combustion zone all problems of damage or destruction to stationary apparatus because of high reaction temperatures is eliminated. Furthermore, there are no stationary chamber walls or adjoining apparatus to which combustion contaminants can adhere and foul and the high velocity water acts as an arcuate positive quench and scrubber for the reacting gases at the end of their scheduled reaction period.

The invention thus consists in a process and apparatus for the production of acetylene which comprises apparatus-wise: (1) a hydrocarbon-oxygen mixing burner; (2) a reaction chamber comprising a moving annular wall of liquid formed by an annular orifice; (3) an adjustable target wall facing the flow of reacting gases and the open end of the liquid chamber for directing the gases to be quenched by the liquid wall at the end of their residence time; and (4) such auxiliary apparatus as may be necessary to confine and treat the quenched gases and quenching liquid and return such liquid for the purpose of maintaining the reaction zone liquid wall.

Figure 2:
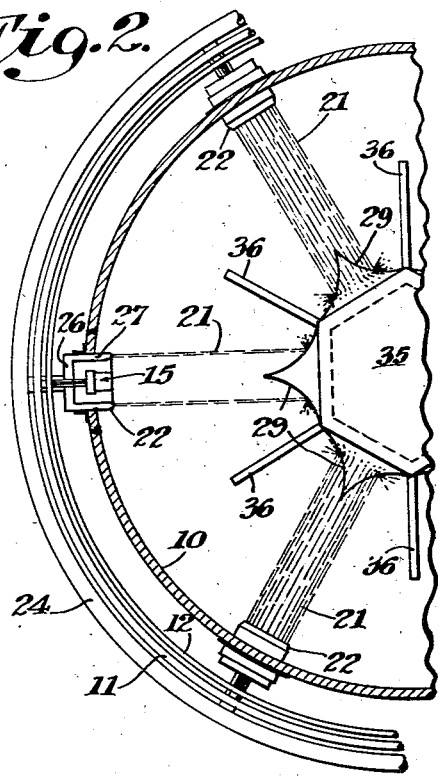
Figure 3:
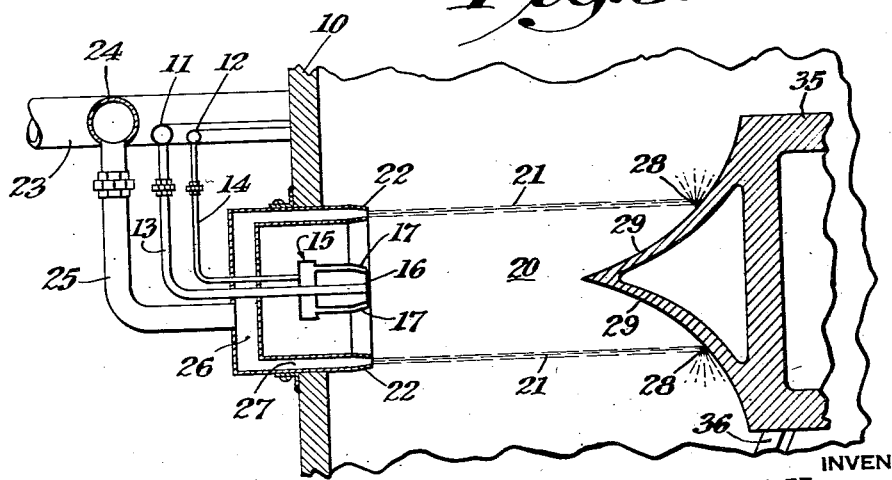

The nature of the invention may readily be understood by reference to the accompanying drawing in which Figure 1 diagrammatically represents a longitudinal cross-section of a tower structure including a plurality of the acetylene producers of my invention. Figure 2 is a partial top cross-sectional view of the tower of Figure 1 better showing the arrangement of the acetylene producers and their auxiliary apparatus. Figure 3 is an enlarged cross-section of a preferred embodiment of one of the units of Figures 1 and 2.

Referring to the drawing, the illustrated apparatus consists of a vertical chamber 10 in which a plurality of similar partial oxidation reactions are to occur. Using a preferred technique of producing acetylene by incomplete combustion of hydrocarbons such as methane, ethane, natural gas or vaporized distillates with oxygen or air, I first preheat the hydrocarbons and oxygen separately and introduce them to respective headers 11 and 12. These headers distribute the heated hydrocarbons and oxygen-containing gas through pipes 13 and 14 to a plurality of mixing burners 15, one of which is best illustrated in Fig. 3. The hydrocarbon gas which is to be reacted by partial oxidation issues at high velocity from a central burner jet 16 and is mixed at reaction temperatures with oxygen or air issuing at high velocity from a plurality of burner jets 17 surrounding the jet 16. The gases issuing from jets 16 and 17 are intimately mixed and react with the formation of a flame which propagates away from the burner-mixing device at high velocity.

In order to produce relatively high yields of acetylene it is necessary to maintain the reacting gas mixture at an acetylene-producing temperature, e. g., between about 1100° C. and about 1500° C., by passage of the reacting mixture through a defined reaction zone. In prior practice, the reaction zone for reactions of this nature have been constructed of metallic or refractory materials which may be injured or destroyed by the high heat of reaction. The reaction zone 20 of the present invention is defined by a moving annular liquid wall 21 which is continually being maintained by liquid, such a water issues at high velocity from a plurality of closely spaced nozzles or an annular orifice 22. It will be noted that heat will be given up to the moving water-wall by radiation and convection. This quantity of heat loss is relatively small, however, in spite of the large temperature difference driving force because of the small area of the water wall and the enormous heat release in the reaction zone. Liquid for forming the moving wall 21 is obtained from a settling tank (not shown) after which it is pumped under high pressure by pump P through line 23, header 24 and line 25 to chamber 26 which includes a liquid directing portion 27 and the orifice 22.

It is well known that acetylene decomposes if maintained at high temperatures for an appreciable time. It has, therefore, become common practice to rapidly reduce the temperature of the reacting gases to below reaction temperatures when a given volume of mixed gases has reacted to produce a maximum yield of acetylene, thereby preserving the maximum quantity of acetylene produced. Accordingly, prior practice has dictated that the high velocity reacting gas mixture, which is expanding as it passes through the reaction zone, be initially quenched to below reaction temperature after about 0.0005 to 0.005 second of residence time in such zone, depending upon the velocity of the gases.

My invention not only provides an improved reactor for confining the reacting gases as previously described but also provides an improved quenching means for quickly and positively reducing the temperature of such gases to below reaction temperatures. This quenching means utilizes the liquid used in forming the reaction chamber wall 21 by directing such liquid in its moving annular form to an annular point or area of contact 28 on a deflecting baffle 29. The annular reaction confining flow of liquid is broken upon contact with the baffle 29 and the liquid is deflected away from the moving liquid wall of the reaction zone.

The gaseous mixture which is reacting in zone 20 of my apparatus is confined by the moving liquid wall 21 and directed to the baffle 29 where after sufficient reaction residence time, it is forced into intimate and complete contact with the liquid of wall 21 at the annular area of contact 28. Complete quenching of the cracked gas mixture to below reaction temperature is accomplished in the vicinity of area 28 by contact with the relatively cool liquid as well as a thorough scrubbing of the cracked gas to remove any undesirable carbonaceous material which may be present as a result of the reaction. The moving liquid wall 21 also provides a continuous surface to collect such carbonaceous matter as would normally deposit upon a metallic or refractory walled reaction chamber. All such carbonaceous matter is carried away from the reaction zone by the liquid as such liquid sprays away from the quench and eventually collects in the lower portion of vessel 10.

The liquid collected in the bottom of vessel 10 is removed through line 30 and is thereafter transferred to a settling tank (not shown) where undesirable carbonaceous matter settles out as the liquid is cooled prior to recirculation to header 24 by pump P.

The partially quenched cracked gas mixture is further reduced in temperature as it rises within the vessel 10 and is contacted with a cooling liquid cascading downwardly from trays 31 and 32 which may be located in the upper portion of the vessel. The liquid which accomplishes this final cooling enters the vessel through line 33 above the trays and may be a portion of the liquid in line 23 which has been pumped from a settling tank. In most instances this contact liquid will be water as will be the liquid necessary to form the liquid wall of the reaction zone.

The cooled cracked gas mixture, including maximum yields of acetylene and other olefinic hydrocarbons, leaves vessels 10 through line 34 and is thereafter passed to other gas purification and separation systems as may be desired.

Figure 2, which is a partial top cross-sectional view of the vessel and reaction apparatus, better illustrates how a plurality of similar reactions of the type described can be carried out within the same vessel. A plurality of chambers 26 including liquid directing portions 27 are spaced at the periphery of vessel 10. Each of the chambers 26 is connected by a pipe 25 to the liquid header 24. Centrally located within each liquid directing portion 27 is a mixing-burner 15. The burner and chamber forming means at each location around the vessel are positioned whereby the reacting gases and encompassing water wall are propagated toward a central baffle support 35 which carries a deflecting baffle 29 for intercepting the liquid wall of each reaction position. The baffle support may be positioned from the bottom of vessel 10 by supports 36.

Since the temperature and time of reaction of the mixed gases in partial oxidation reactions of the type described hereinbefore are critical and are affected by such variables as quantity and velocity of the gases and the length of reaction zone from the start of reaction to quench, it is obvious that appropriate control over the gas feed to the mixing burner must be provided. Also the length of the reaction zone may be varied by positioning the burner-mixing device and liquid wall forming means toward or away from the baffle 29.

To start the reaction, the mixed gases issuing from the burner 15 are lit-off by auxiliary means (not shown) with the moving liquid reaction chamber wall 21 being formed rapidly thereafter and in a manner to avoid extinguishment or quenching of the reaction.

The following example typifies the production capacity for acetylene of a single partial combustion gas burner designed in accord with my invention.

Reaction zone:
   Length from the burner to
      point of quench_____ 17.0 inches.
   I. D. of liquid reactor wall____ 6.0 inches.
Feed gas:
   Natural gas: rate of feed_____ 57,400 S. C. F./hr.
   Oxygen: rate of feed_____ 38,900 S. C. F./hr.
Reaction temperature_____ 2,500° F.
Total reaction time_____ .001 sec.
Reaction gas velocity_____ 1,415 ft./sec
Burner gas (2500° F)_____ 1,000,000 C. F./hr.
Cracked gas produced including
   acetylene_____ 176,000 S. C. F./hr.
                                      at 60° F.
Refined acetylene produced_____ 8 ton/day.

While I have shown and described a preferred form of embodiment of my invention, I am aware that modifications may be made thereto, such as providing a shroud member around the liquid wall reaction chamber for part of its length to assure that the moving liquid wall retains its form during its movement to the area of quench or positioning the burner, liquid wall forming means and target wall in vertical alignment whereby the moving liquid wall falls to the area of quench. It may also be desirable under certain conditions to provide a positive water flow over the surface of the impingement baffle that lies within the quenching annulus, to prevent carbon deposition thereon. I, therefore, desire a broad interpretation of the invention within the scope and spirit of the description herein and of the claims appended hereinafter.

I claim:

1. A process for the conversion of hydrocarbons which comprises maintaining an elongated tubular wall of relatively cool moving liquid, mixing preheated hydrocarbons and an oxygen-containing gas within the zone defined by said liquid wall and passing said mixture through said zone for thermal reaction therein, and interrupting the flow of moving liquid forming said wall and the gases of conversion contained therein by a baffle means whereby such gases are forced into intimate contact with the relatively cool liquid forming said wall and are thereby scrubbed and rapidly quenched to a temperature at which substantially no further reaction occurs.

2. The process of claim 1 in which the liquid forming the moving wall collects and carries away from the reaction zone carbonaceous material formed during reaction therein.

3. A process for the production of acetylene which comprises maintaining an elongated tubular wall of relatively cool moving liquid by discharging said liquid from an annular orifice at relatively high velocity, mixing preheated gaseous hydrocarbons and an oxygen-containing gas within the zone defined by said liquid wall and passing the mixed gases through said zone for acetylene-producing reaction therein, controlling the temperature of the mixed gases and their proportions so that the temperature in said zone during reaction is between 1100° C. and 1500° C., and interrupting the flow of moving liquid forming said wall and the acetylene-containing product gas contained therein by a baffle means whereby the product gas is forced into intimate contact with the relatively cool liquid forming said wall and is thereby scrubbed and rapidly quenched to a temperature at which substantially no further reaction occurs.

4. A process for the production of acetylene which comprises supplying a relatively cool liquid to an annular orifice, discharging said liquid from said orifice at a relatively high velocity and in sufficient quantity to form a continuous tubular moving wall of said liquid, mixing preheated gaseous hydrocarbons and an oxygen-containing gas within the zone defined by said liquid wall and passing the mixed gases through said zone for acetylene-producing reaction therein, controlling the temperature of the mixed gases and their proportions so that the temperature in said zone during reaction is between 1100° C. and 1500° C., and interrupting the flow of moving liquid forming said wall and the acetylene-containing product gas contained therein by a baffle means whereby the product gas is forced into intimate contact with the relatively cool liquid forming said wall and is thereby rapidly quenched to a temperature at which substantially no further reaction occurs.

5. A process for the production of acetylene which comprises burning a mixture of gaseous hydrocarbons and an oxygen-containing gas in a reaction zone defined by a relatively cool moving liquid wall, maintaining said zone at an acetylene-producing temperature, and interrupting the flow of moving liquid forming said reaction zone and the acetylene-containing product gas contained therein by a deflecting baffle whereby the product gas is forced into intimate contact with the liquid forming said wall and is thereby scrubbed and simultaneously quenched to a temperature at which substantially no further reaction occurs.

6. A process for the production of acetylene which comprises maintaining an elongated tubular wall of relatively cool moving liquid by discharging said liquid from an annular orifice at relatively high velocity, mixing preheated gaseous hydrocarbons and an oxygen-containing gas within the zone defined by said liquid wall and passing the mixed gases through said zone for acetylene producing reaction therein, controlling the temperature of the mixed gases and their proportions so that the temperature in said zone during reaction is between 1100° C. and 1500° C., collecting carbon formed during reaction on said wall, and interrupting the flow of moving liquid forming said wall and the acetylene-containing product gas contained therein whereby the product gas is forced into intimate contact with the relatively cool liquid forming said wall and is thereby scrubbed and simultaneously quenched to a temperature at which substantially no further reaction occurs.

References Cited in the file of this patent

UNITED STATES PATENTS

| | | |
|---|---|---|
| 2,292,355 | Ayers | Aug. 11, 1942 |
| 2,343,866 | Hincke | Mar. 14, 1944 |
| 2,377,847 | Allen et al. | June 12, 1945 |
| 2,574,489 | Lassiat et al. | Nov. 13, 1951 |
| 2,672,488 | Jones | Mar. 16, 1954 |
| 2,721,227 | Mungen | Oct. 18, 1955 |